(12) United States Patent
Aurelle et al.

(10) Patent No.: US 12,448,040 B2
(45) Date of Patent: Oct. 21, 2025

(54) METHOD FOR INFLUENCING A VEHICLE MOVEMENT OF A VEHICLE

(71) Applicant: Robert Bosch GmbH, Stuttgart (DE)

(72) Inventors: Cecile Aurelle, Abtsgmuend (DE); Roberto Saracino, Esslingen Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 161 days.

(21) Appl. No.: 18/353,208

(22) Filed: Jul. 17, 2023

(65) Prior Publication Data

US 2024/0043062 A1 Feb. 8, 2024

(30) Foreign Application Priority Data

Aug. 4, 2022 (DE) ............. 10 2022 208 118.8

(51) Int. Cl.
*B62D 7/15* (2006.01)
(52) U.S. Cl.
CPC .................... *B62D 7/159* (2013.01)
(58) Field of Classification Search
CPC ...... B62D 7/159; B62D 15/025; B62D 6/003; B60W 30/025; B60W 40/10; B60R 16/037
See application file for complete search history.

(56) References Cited

FOREIGN PATENT DOCUMENTS

| CN | 110857116 A | * | 3/2020 | ............. B62D 5/008 |
|---|---|---|---|---|
| DE | 10 2015 015 306 A1 | | 5/2016 | |
| DE | 10 2017 219 585 A1 | | 5/2019 | |
| WO | WO9205994 A1 | * | 4/1992 | |

* cited by examiner

*Primary Examiner* — Lindsay M Low
*Assistant Examiner* — Charles J Brauch
(74) *Attorney, Agent, or Firm* — Maginot, Moore & Beck LLP

(57) ABSTRACT

A method for influencing a vehicle movement of a vehicle, in particular a motor vehicle, wherein the vehicle comprises a steering system having a front axle steering and a rear axle steering, and wherein the vehicle movement is influenced in at least one driving state by an actuation of the front axle steering and/or the rear axle steering. In the driving state, a yaw movement of the vehicle is adjusted by a combined actuation of the front axle steering and the rear axle steering in such a way that the yaw movement is at least partially independent of a target vehicle trajectory and a yaw acceleration and/or yaw jerk is reduced.

10 Claims, 3 Drawing Sheets

METHOD FOR INFLUENCING A VEHICLE MOVEMENT OF A VEHICLE

This application claims priority under 35 U.S.C. § 119 to application no. DE 10 2022 208 118.8, filed on Aug. 4, 2022 in Germany, the disclosure of which is incorporated herein by reference in its entirety.

BACKGROUND

The disclosure relates to a method for influencing a vehicle movement of a vehicle, in particular a motor vehicle. The disclosure also relates to a computing unit for carrying out such a method and a vehicle comprising such a computing unit.

While driving a vehicle, for example a motor vehicle, some people can experience physical reactions such as paleness, dizziness, headache, nausea, and/or vomiting. Such symptoms are known as motion sickness, also known as kinetosis in the field. The cause is a deviation between the visual perception of the eyes and the vestibular perception, i.e., the equilibrium organ. This becomes significantly worse once again if other activities are performed by the occupants during the journey. For example, the occupants of an autonomously-driving vehicle no longer need to perform the task of controlling the vehicle, and accordingly can be completely engaged in activities that are not associated with driving. In this case, however, any dynamic suggestions that arise from vehicle movement present a potential physiological and mental burden to the occupants, and thus immediately affect the travel comfort.

In order to reduce such kinetosis-related symptoms and/or to increase travel comfort, various methods for influencing vehicle movement of a motor vehicle are known from the prior art, for example DE 10 2017 219 585 A1 and DE 10 2015 015 306 A1, in which vehicle movement in at least one driving state is influenced by an actuation of a front axle steering and/or a rear axle steering of the vehicle. However, an adjustment of a yaw movement of the vehicle is not the focus of these known methods.

The problem addressed by the disclosure, based on the foregoing, is in particular to provide a method for influencing vehicle movement of a vehicle, in which an influence on a driver and/or occupants of the vehicle caused by a yaw movement of the vehicle is advantageously reduced. The problem is solved by the features disclosed herein, while advantageous configurations and further developments of the disclosure can be found in the disclosure.

SUMMARY

The disclosure relates to a method, in particular a computer-implemented method, for influencing a vehicle movement of a vehicle, in particular of a motor vehicle, wherein the vehicle comprises a steering system including a front axle steering and including an in particular active rear axle steering, and wherein the vehicle movement is influenced in at least one driving state, preferably an automated driving state, by the actuation of the front axle steering and/or the rear axle steering.

It is proposed that, in the driving state, a yaw movement of the vehicle, in particular a movement about a vertical and/or high axis of the vehicle, is adjusted by a combined actuation of the front axle steering and the rear axle steering, that the yaw movement is at least partially independent of a target vehicle trajectory, and an acceleration of yaw of the vehicle and/or a yaw jerk of the vehicle, i.e., in particular a time change in the yaw acceleration, is reduced. In particular, the yaw movement is adjusted such that an influence caused by the yaw movement is reduced on at least one driver and/or occupant of the vehicle, thereby increasing travel comfort and/or reducing kinetosis-related symptoms for at least one occupant. Particularly preferably, the adjustment of the yaw movement occurs such that the yaw acceleration and/or yaw jerk are minimized. With this configuration, an influence on a driver and/or occupants of the vehicle caused by a yaw movement of the vehicle can be reduced particularly simply and effectively. In particular, this can increase travel comfort and/or reduce kinetosis-related symptoms for the occupant. In addition, due to the combined front and rear axle steering, the yaw movement of the vehicle can be advantageously designed at least partially independently of the tracked vehicle trajectory, whereby an acceleration of yaw and/or a yaw jerk can be advantageously adjusted to the respective driving situation.

In the present case, the steering system can be configured as a conventional mechanical steering system, in particular as an electric power steering or superimposition steering or active steering, wherein there is a mechanical connection at least between a steering handling system of the steering system and the front axle steering. Alternatively, the steering system can be designed as a steer-by-wire steering system, in which a steering command is advantageously transmitted to the vehicle wheels purely electrically. In this case, the steering system in particular comprises at least one wheel steering angle controller for changing a wheel steering angle of at least one vehicle wheel and advantageously a control unit separated mechanically from the at least one wheel steering angle controller and actuatable by a driver. A "steering system with a front axle steering" is intended to be understood to mean a steering system with a steerable front axle, wherein the front axle steering is provided for adjusting at least one vehicle wheel connected to the front axle steering system and advantageously at least two vehicle wheels connected to the front axle steering system, for example, as a function of a steering command, for example at a steering handling system of the steering system. For this purpose, the front axle steering can comprise at least one wheel steering angle controller in the form of a central controller or a plurality of wheel steering angle controllers in the form of individual wheel controllers, being connected in particular to one vehicle wheel only. A "steering system with an in particular active rear axle steering" is understood as a steering system with a steerable rear axle, wherein the rear axle steering is provided in particular so as to cooperate with the front axle steering and, as a function of a steering command, for example, at the steering handling system of the steering system, to adjust at least one vehicle wheel connected to the rear axle steering and advantageously at least two vehicle wheels connected to the rear axle steering. For this purpose, the rear axle steering can comprise a further wheel steering angle controller, in particular being connected to at least two vehicle wheels, in the form of a central controller or a plurality of further wheel steering angle controller in the form of individual wheel controllers, being connected in particular to only one vehicle wheel. Furthermore, an "automatizing driving state" is to be understood in particular as an at least semi-automated driving state, in which the driver and/or occupant can advantageously at least temporarily disengage from the task of driving and paying attention to traffic. Particularly preferably, the vehicle has an automated driving mode with an automation level of at least 3 or at least 4 in order to carry out the automated driving state. In particular, the automated driving state can also include an autonomous driving mode in the present case.

The vehicle also comprises at least one computing unit, which is provided in order to carry out the method for influencing the vehicle movement of the vehicle. The term "computing unit" is in particular intended to mean an electrical and/or electronic unit which comprises an information input, an information processor, and an information output. The computing unit advantageously further comprises at least one processor, at least one operating memory, at least one input and/or output means, at least one operating program, at least one control routine, at least one calculation routine, at least one evaluation routine and/or at least one actuation routine. In particular, the computing unit is provided, in particular by means of the actuation routine, for controlling the front axle steering and the rear axle steering. In the present case, the computing unit is provided at least in the driving state for a combined actuation of the front axle steering and the rear axle steering. Also, the computing unit is provided in order to adjust the yaw movement of the vehicle. In the present case, the computing unit is provided so as to adjust, in the driving state, a yaw movement of the vehicle by a combined actuation of the front axle steering and the rear axle steering in such a way that the yaw movement is at least partially independent of a target vehicle trajectory and a yaw acceleration and/or yaw jerk is reduced. Furthermore, the computing unit can be provided in order to determine, in particular, an upcoming or future vehicle trajectory of the vehicle and to evaluate it for adjustment of the yaw movement. The computing unit is in this case preferably integrated into a control device of the vehicle, e.g., a central vehicle control device, or a control device of the steering system, in particular in the form of a steering control device. The term "provided" is in particular intended to mean specifically programmed, designed, and/or equipped. The phrase "an object being provided for a specific function" is particularly intended to mean that the object fulfills and/or performs this specific function in at least one application and/or operating state.

Furthermore, it is proposed that the yaw movement, in particular in the driving state, is adjusted such that a yaw movement of the vehicle required for the target vehicle trajectory is distributed over a longer distance, for example several meters or even several hundred meters. The time derivatives of the required yaw angles can thereby be reduced, and consequently a reduction of the yaw acceleration and/or the yaw jerk can be achieved.

It is further proposed that the yaw movement, in particular in the driving state, is adjusted such that a specified limit value for the yaw acceleration is not exceeded. Accordingly, in the present case, a maximum yaw acceleration of the vehicle is in particular limited. Advantageously, an average perception threshold or yaw acceleration of the human vestibular system can serve as the limit value. This can provide the occupants with a particularly comfortable travel feeling and reduce kinetosis-related symptoms for the occupant.

A particularly simple modification of the yaw movement of the vehicle can be achieved when a slip angle of the vehicle is varied as a function of the target vehicle trajectory, in particular in the driving state. If the slip angle is selected as non-zero, this means in particular that the speed vector of the vehicle is angular to a longitudinal axis of the vehicle or encloses an angle with the longitudinal axis of the vehicle, respectively.

For example, the driving state could be an overtaking maneuver. However, according to one embodiment of the disclosure, it is proposed that the driving state comprises a turn, and the yaw movement is adjusted before the start of the turn and/or after the end of the turn. In particular, the adjustment of the yaw movement can also start or take place well before the turn start, for example several meters or even several hundred meters in front of the turn start, and/or well after the turn end, for example several meters or even several hundred meters after the turn end. As a result, the vehicle movement can be adjusted to the turn operation in a particularly advantageous manner.

In addition, it is proposed that the yaw movement, in particular in the driving state, is adjusted such that a longitudinal axis of the vehicle in the region of the turn start and/or in the region of the turn end has an angle relative to the target vehicle trajectory. The angle can in particular correspond to the aforementioned slip angle. A "range of the turn start" is to be understood in particular to mean a short range directly in front of the turn to be traversed. A "range of the turn end" is to be understood in particular to mean a short range directly after the traversed turn. This can further improve the vehicle movement.

In this context, for example, the yaw movement can be adjusted such that the longitudinal axis of the vehicle is aligned in the region of the turn start in the direction of the inside of the turn and in the region of the turn end parallel to the target vehicle trajectory. Preferably, in this case, the slip angle of the vehicle is adjusted such that the slip angle in the region of the turn start corresponds to a total turning angle for the turn to be traversed. Prior to traversing the turn, the vehicle is slowly rotated in a direction facing away from the target vehicle trajectory, in particular such that the longitudinal axis of the vehicle is angularly aligned with the target vehicle trajectory in the region of the turn start. In this case, as the turn is traversed, no further rotation of the vehicle occurs. Alternatively, however, the vehicle could also be rotated slowly relative to the target vehicle trajectory while traversing the turn, in particular if the slip angle in the region of the turn start deviates from the total turning angle or is selected differently.

Alternatively or additionally, the yaw movement can be adjusted such that the longitudinal axis of the vehicle is aligned in the region of the turn start parallel to the target vehicle trajectory and in the region of the turn end in the direction of the outside of the turn. Preferably, in this case, the slip angle of the vehicle is adjusted such that the slip angle in the region of the turn end corresponds to a total turning angle for the turn traversed. In this case, as the turn is traversed, no rotation of the vehicle occurs. After traversing the turn, the vehicle is then slowly rotated back toward the target vehicle trajectory, in particular such that the longitudinal axis of the vehicle is aligned parallel to the target vehicle trajectory. Alternatively, however, the vehicle could also be rotated slowly relative to the target vehicle trajectory while traversing the turn, in particular if the slip angle in the region of the turn start and/or in the region of the turn end is intended to be varied.

Alternatively or additionally, the yaw movement can be adjusted such that the longitudinal axis of the vehicle is aligned in the region of the turn start in the direction of the inside of the turn and in the region of the turn end in the direction of the outside of the turn. Preferably, in this case, the slip angle of the vehicle is adjusted such that the slip angle in the region of the turn start and in the region of the turn end corresponds to half of the total turning angle for the turn to be traversed or for the turn traversed. Prior to traversing the turn, the vehicle is slowly rotated in a direction facing away from the target vehicle trajectory, in particular such that the longitudinal axis of the vehicle is angularly aligned with the target vehicle trajectory in the region of the turn start. In this case, as the turn is traversed, no rotation of the vehicle occurs. After traversing the turn, the vehicle is slowly rotated back toward the target vehicle trajectory, in particular such that the longitudinal axis of the vehicle is aligned parallel to the target vehicle trajectory. Alternatively, however, the vehicle could also be rotated slowly relative to the target vehicle trajectory while traversing the turn, in particular if the slip angle in the region of the turn start and/or in the region of the turn end is intended to be varied.

In a further configuration, it is proposed that a vehicle speed is considered when adjusting the yaw movement. By considering the vehicle speed, in particular, a travel time of the vehicle, for example until reaching a turn and/or for traversing a turn, can be determined and considered when adjusting the yaw movement.

Preferably, it is further proposed that, in the driving state, a dynamic optimization of the yaw movement occurs as a function of the target vehicle trajectory, wherein, during the dynamic optimization of the yaw movement, an intended reduction of the yaw acceleration and/or yaw jerk, a maximum permitted yaw acceleration for the driving state, the vehicle speed, and/or a length of the distance are considered and linked together. In particular, a best possible compromise between the target vehicle trajectory and the associated yaw movement and the adjustment of the yaw movement can be achieved. In addition, with this measure, a sequence of different curves can also optimally be driven through, in particular.

The method for influencing the vehicle movement and the vehicle is not intended to be limited to the application and embodiment described above. In particular, in order to achieve the functioning described herein, the method for influencing the vehicle movement and the vehicle can comprise a number of individual elements, components, and units that differ from the number thereof specified herein.

BRIEF DESCRIPTION OF THE DRAWINGS

Further advantages will become apparent from the description of the drawings hereinafter. The drawings illustrate an exemplary embodiment of the disclosure.

The drawings show.

DETAILED DESCRIPTION

Figure 1:
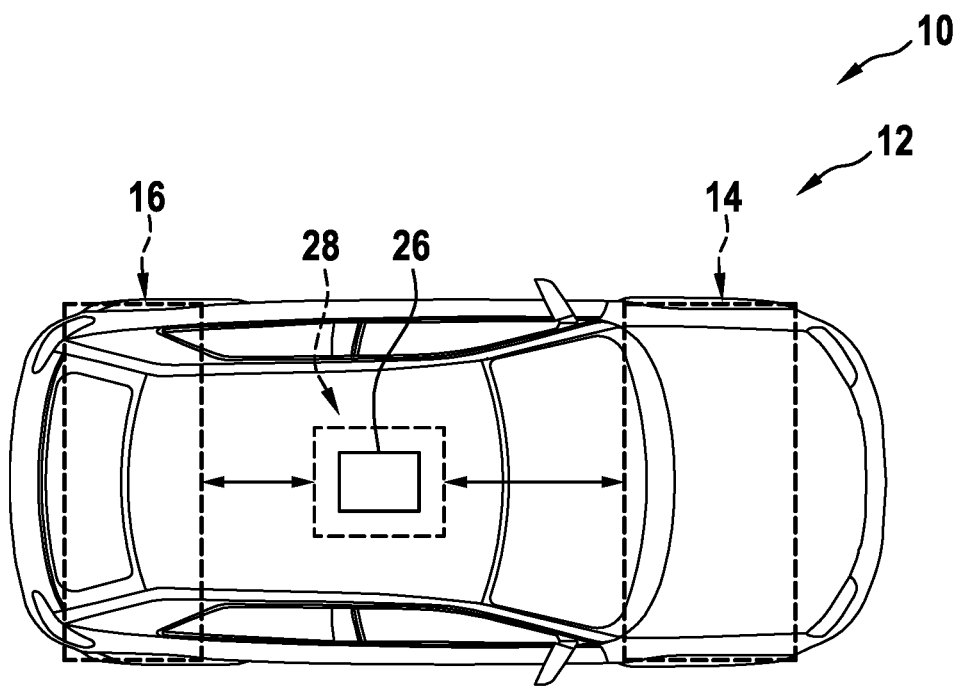
FIG. 1 a vehicle having a steering system comprising a front axle steering and a rear axle steering, in a simplified view, FIGS. 2a-c the vehicle in various exemplary driving states, in which a yaw movement of the vehicle is adjusted by a combined actuation of the front axle steering and the rear axle steering, and FIG. 3 an exemplary flowchart with main method steps of a method for influencing a vehicle movement of the vehicle.

FIG. 1 shows an exemplary vehicle 10 configured as a motor vehicle having a plurality of vehicle wheels (not shown) and a steering system 12 in a schematic view. In the present case, the steering system 12 can be configured as a conventional mechanical steering system or also as a steer-by-wire steering system. In each case, the steering system 12 has an operative connection to the vehicle wheels and is provided so as to influence a direction of travel of the vehicle 10. For this purpose, the steering system 12 comprises a steering handling system (not shown), for example in the form of a steering wheel, a front axle steering 14 associated with the steering handling system, and a rear axle steering 16 operatively connected to the steering handling system and the front axle steering 14. In addition, in the present case, the vehicle 10 has an automated driving mode with an automation level of at least 3. However, in principle, a steering handling system could also be omitted, for example in a purely autonomously driving vehicle.

The front axle steering 14 and the rear axle steering 16 are of a construction that is known per se. In the present case, the front axle steering 14 and the rear axle steering 16 can comprise a respective wheel steering angle controller (not shown) configured as a center controller in order to control a wheel steering angle of the vehicle wheels, for example. Alternatively, however, a front axle steering and/or a rear axle steering could also comprise at least two wheel steering angle controllers configured as a single wheel controller. A steering system could in principle also comprise a combination of wheel steering angle controllers configured as a single wheel controller and a wheel steering angle controller configured as a central controller.

The vehicle 10 further comprises a control device 28. In the present case, the control device 28 is designed as a steering control device and is therefore part of the steering system 12. The control unit 28 has an electrical connection to the steering handling system. Furthermore, the control device 28 has an electrical connection to the front axle steering 14. The control unit 28 further has an electrical connection to the rear axle steering 16. In the present case, at least the steering handling system, the front axle steering 14, and the rear axle steering 16 are thus communicatively connected to one another via the control device 28. The control device 28 is provided at least for controlling an operation of the steering system 12.

The control unit 28 comprises a computing unit 26 for this purpose. The computing unit 26 comprises at least one processor (not shown), for example in the form of a microprocessor, and at least one operating memory (not shown). The computing unit 26 also comprises at least one operating program which is stored in the operating memory and includes at least one calculation routine, at least one evaluation routine, and at least one actuation routine. A control device could in principle also be different from a steering control device and could be designed, for example, as a single, central vehicle control device having a central computing unit. It is also conceivable to provide separate control devices and/or computing units for a front axle steering and a rear axle steering and communicatively interconnect them.

The vehicle 10 can furthermore comprise other, not depicted components and/or assemblies, such as, for example, a surroundings sensor system, known per se, a vehicle sensor system, known per se, for detecting a speed, an on-board computer, known per se, and/or a navigation device, known per se. The control unit 28 preferably comprises an electrical connection to the surroundings sensor system, the vehicle sensor system, the on-board computer, and/or the navigation device. In principle, however, it is also conceivable to omit a surroundings sensor system, a vehicle sensor system, an on-board computer, and/or a navigation device.

During a drive, some people can experience physical reactions such as paleness, dizziness, headache, nausea, and/or vomiting. Such symptoms are known as motion sickness, also known as kinetosis in the field. The cause is a deviation between the visual perception of the eyes and the vestibular perception, i.e., the equilibrium organ. This becomes significantly worse once again if other activities are performed by the occupants during the journey.

A method for influencing a vehicle movement of the vehicle 10 is therefore proposed in the following in order to reduce such kinetosis-related symptoms and/or to increase travel comfort. In the present case, the computing unit 26 is provided in order to carry out the method and has a computer program with corresponding program code means for this purpose.

According to the present disclosure, in at least the driving state, a yaw movement of the vehicle 10 is adjusted by a combined actuation of the front axle steering 14 and the rear axle steering 16 in such a way that the yaw movement is at least partially independent of a target vehicle trajectory 18 and a yaw acceleration of the vehicle 10 and/or yaw jerk of the vehicle 10 is reduced and preferably minimized. The yaw movement is modified such that an influence caused by the yaw movement of the vehicle 10 on at least one driver and/or occupant of the vehicle 10 is reduced, thereby increasing travel comfort and reducing kinetosis-related symptoms of the occupants. Furthermore, in the present case, the driving state corresponds to an automated driving state. However, in principle, a driving state could also correspond to a manual driving state, for example using a steer-by-wire steering system.

Furthermore, in the present case, the yaw movement is adjusted such that a yaw movement of the vehicle 10 required for the target vehicle trajectory 18 is distributed over a longer distance, for example several meters or even several hundred meters, thereby reducing the time derivatives of the required yaw angles and consequently achieving a reduction in the yaw acceleration and/or yaw jerk.

In addition, the yaw movement is adjusted in the present case such that a specified limit value for yaw acceleration is not exceeded. In this context, a maximum yaw acceleration of the vehicle 10 is limited, wherein a limit value is an average perception threshold or yaw acceleration of the human vestibular system.

To adjust the yaw movement, in the present case, a slip angle 20 of the vehicle 10, i.e., an angle between a speed vector of the vehicle 10 and a longitudinal axis 24 of the vehicle 10, is further varied as a function of the target vehicle trajectory 18.

Moreover, a vehicle speed can be considered when adjusting the yaw movement, for example, whereby a travel time of the vehicle 10 can be determined and considered when adjusting the yaw movement.

Figure 2A:
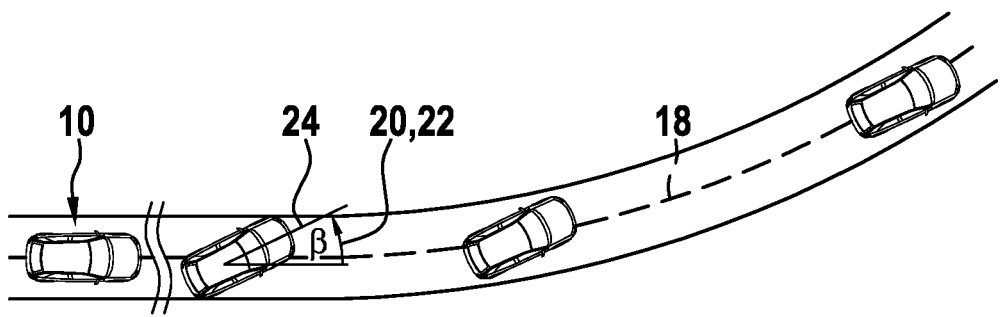
Figure 2B:
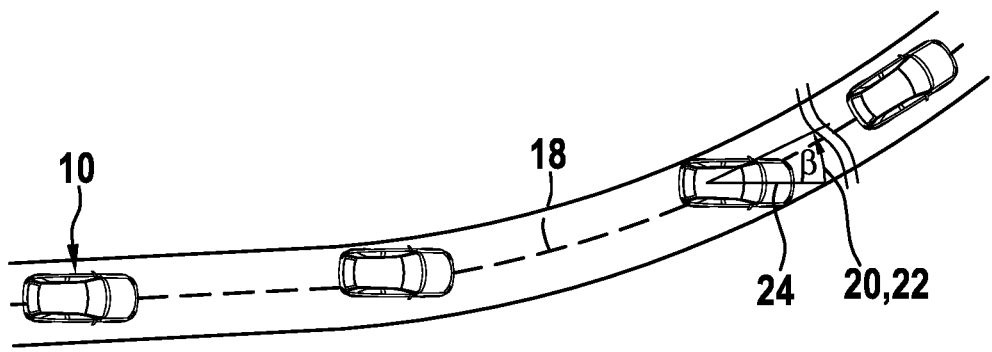
Figure 2C:
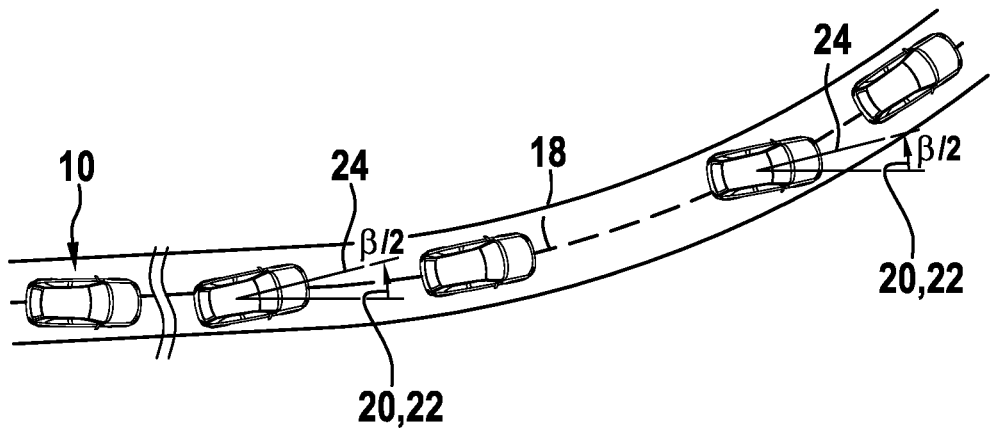

FIGS. 2a to 2c show the vehicle 10 in various exemplary driving states in which the yaw movement of the vehicle 10 is adjusted by a combined actuation of the front axle steering 14 and the rear axle steering 16.

The driving state in this case includes a turn. In addition, the yaw movement is adjusted before the turn start and/or after the turn end. In the present case, the yaw movement is always adjusted such that the longitudinal axis 24 of the vehicle 10 in the region of the turn start and/or in the region of the turn end has an angle 22 relative to the target vehicle trajectory 18. The angle 22 is in particular the slip angle 20.

According to an exemplary first application case, which is shown in FIG. 2a in particular, the yaw movement of the vehicle 10 is adjusted such that the longitudinal axis 24 of the vehicle 10 is aligned in the region of the turn start in the direction of the inside of the turn and in the region of the turn end parallel to the target vehicle trajectory 18. The slip angle 20 of the vehicle 10 is adjusted so as to correspond to a total turning angle for the turn to be traversed in the region of the turn start.

In this case, prior to traversing the turn, the vehicle 10 is slowly rotated in a direction facing away from the target vehicle trajectory 18, namely such that the longitudinal axis 24 of the vehicle 10 is angularly aligned with the target vehicle trajectory 18 in the region of the turn start. The adjustment of the yaw movement can also start well before the turn start, for example several meters or even several hundred meters before the turn start. No further rotation of the vehicle 10 occurs while traversing the turn and after traversing the turn. In this case, because the slip angle 20 of the vehicle 10 is adjusted to correspond to a total turning angle for the turn to be traversed in the region of the turn start, a further rotation of the vehicle 10 during the traversing of the turn and/or after traversing the turn is also not necessary. Alternatively, however, the vehicle 10 could also be rotated slowly relative to the target vehicle trajectory 18 while traversing the turn, in particular if a slip angle in the region of the turn start deviates from the total turning angle or is selected differently.

According to an exemplary second application case, which is shown in FIG. 2b in particular, the yaw movement of the vehicle 10 is adjusted such that the longitudinal axis 24 of the vehicle 10 is aligned in the region of the turn start parallel to the target vehicle trajectory 18 and in the region of the turn end in the direction of the outside of the turn. The slip angle 20 of the vehicle 10 is adjusted so as to correspond to a total turning angle for the traversed turn in the region of the turn end.

In this case, no rotation of the vehicle 10 occurs prior to traversing the turn and while traversing the turn. After traversing the turn, the vehicle 10 is then slowly rotated back toward the target vehicle trajectory 18 such that the longitudinal axis 24 of the vehicle 10 is aligned parallel to the target vehicle trajectory 18. The adjustment of the yaw movement can also end well after the turn end, for example several meters or even several hundred meters after the turn end. Alternatively, however, the vehicle 10 could also be rotated slowly relative to the target vehicle trajectory 18 while traversing the turn, in particular if a slip angle in the region of the turn end is intended to deviate from the total turning angle.

According to an exemplary third application case, which is shown in FIG. 2c in particular, the yaw movement of the vehicle 10 is adjusted such that the longitudinal axis 24 of the vehicle 10 is aligned in the region of the turn start in the direction of the inside of the turn and in the region of the turn end in the direction of the outside of the turn. The slip angle 20 of the vehicle 10 is preferably adjusted such that it corresponds to half of the total turning angle for the turn to be traversed or the turn traversed in the region of the turn start and in the region of the turn end.

In this case, prior to traversing the turn, the vehicle 10 is slowly rotated in a direction facing away from the target vehicle trajectory 18, namely such that the longitudinal axis 24 of the vehicle 10 is angularly aligned with the target vehicle trajectory 18 in the region of the turn start. The adjustment of the yaw movement can also start well before the turn start, for example several meters or even several hundred meters before the turn start. No further rotation of the vehicle 10 occurs while traversing the turn. In this case, because the slip angle 20 of the vehicle 10 is adjusted to correspond to half of the total turning angle for the turn to be traversed in the region of the turn start, the slip angle 20 also corresponds to half of the total turning angle in the region of the turn end, wherein the vehicle 10 is inclined towards the outside of the turn. As a result, the vehicle 10 is slowly rotated back towards the target vehicle trajectory 18 after traversing the turn, such that the longitudinal axis 24 of the vehicle 10 is aligned parallel to the target vehicle trajectory 18. The adjustment of the yaw movement can also end well after the turn end, for example several meters or even several hundred meters after the turn end. Alternatively, however, the vehicle 10 could also be rotated slowly relative to the target vehicle trajectory 18 while traversing the turn, in particular if a slip angle in the region of the turn start and/or in the region of the turn end is intended to deviate from half of the total turning angle.

Preferably, in the driving state, there is further dynamic optimization of yaw movement as a function of the target vehicle trajectory 18. In this context, for example, an intended reduction in the yaw acceleration and/or yaw jerk, a maximum permitted yaw acceleration for the driving state, the vehicle speed, and/or a length of distance can be considered. In addition, the variables mentioned can preferably be linked together in order to achieve the best possible compromise between the target vehicle trajectory 18 and the associated yaw movement as well as the adjustment of the yaw movement. In addition, with this measure, a sequence of different curves can also optimally be driven through, in particular.

Figure 3:
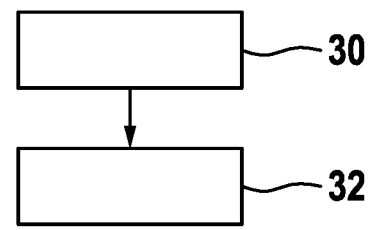

Finally, FIG. 3 shows an exemplary flowchart with main method steps of the method for influencing the vehicle movement of the vehicle 10.

In a method step 30, a current driving state is first determined. For example, the computing unit 26 can be provided so as to determine an automated driving mode and/or an anticipated and/or future vehicle trajectory of the vehicle 10. In the present case, for example, it can be determined whether the preceding and/or future vehicle trajectory of the vehicle 10 includes a turn.

In a subsequent method step 32, the vehicle movement is adjusted by combined actuation of the front axle steering 14 and the rear axle steering 16 such that yaw movement of vehicle 10 is at least partially independent of the target vehicle trajectory 18, and the yaw acceleration of vehicle 10 and/or yaw jerk of vehicle 10 in the driving state or at least while traversing the turn is reduced and preferably minimized. In particular, the yaw movement is adjusted such that, in the driving state, an influence caused by the yaw movement is reduced on at least one driver and/or occupant of the vehicle 10, thereby increasing a travel comfort and/or reducing kinetosis-related symptoms for at least one occupant.

The exemplary flowchart shown in FIG. 3 is merely intended to describe, by way of example, a method for influencing the vehicle movement of the vehicle 10. In particular, individual method steps can also vary, or additional method steps can be added. In this context, for example, it is contemplated that vehicle speed will be considered when adjusting yaw movement and/or dynamically optimize yaw movement in the driving state as a function of the target vehicle trajectory 18.

What is claimed is:

1. A method for influencing a yaw movement of a vehicle as the vehicle moves along a target vehicle trajectory, wherein the vehicle comprises a steering system having a front axle steering and a rear axle steering, and wherein the yaw movement is influenced in at least one driving state of the vehicle by an actuation of the front axle steering and/or the rear axle steering, comprising:
    adjusting, in the at least one driving state, the yaw movement of the vehicle by a combined actuation of the front axle steering and the rear axle steering, such that as the vehicle moves along the target vehicle trajectory (i) the yaw movement of the vehicle is at least partially independent of the target vehicle trajectory, and (ii) a yaw acceleration of the vehicle and/or a yaw jerk of the vehicle is reduced.

2. The method according to claim 1, wherein the yaw movement is adjusted such that the yaw movement is distributed over a longer distance than a yaw movement of the vehicle required for the target vehicle trajectory.

3. The method according to claim 1, wherein the yaw movement is adjusted such that a specified limit value for yaw acceleration is not exceeded.

4. The method according to claim 1, wherein for adjusting the yaw movement, a slip angle of the vehicle is varied as a function of the target vehicle trajectory.

5. The method according to claim 1, wherein:
    the at least one driving state includes a turn having a start of the turn and an end of the turn; and
    the yaw movement is adjusted before the start of the turn and/or after the end of turn.

6. The method according to claim 5, wherein the yaw movement is adjusted such that a longitudinal axis of the vehicle in a region of the start of the turn and/or in a region of the end of the turn has an angle relative to the target vehicle trajectory.

7. The method according to claim 1, wherein when adjusting the yaw movement, a vehicle speed is considered.

8. The method according to claim 1, wherein:
    in the at least one driving state, a dynamic optimization of the yaw movement occurs as a function of the target vehicle trajectory; and
    during the dynamic optimization of the yaw movement, an intended reduction of the yaw acceleration and/or the yaw jerk, a maximum permitted yaw acceleration for the at least one driving state, a vehicle speed, and a length of a distance are considered and linked together.

9. A computing unit configured to perform the method according to claim 1.

10. A motor vehicle, comprising:
    a steering system comprising a front axle steering and a rear axle steering; and
    the computing unit according to claim 9.

* * * * *